April 22, 1969  S. W. McNEELY ET AL  3,439,535
DEVICE FOR MEASURING MACHINE PRESSURE
Filed Aug. 11, 1966
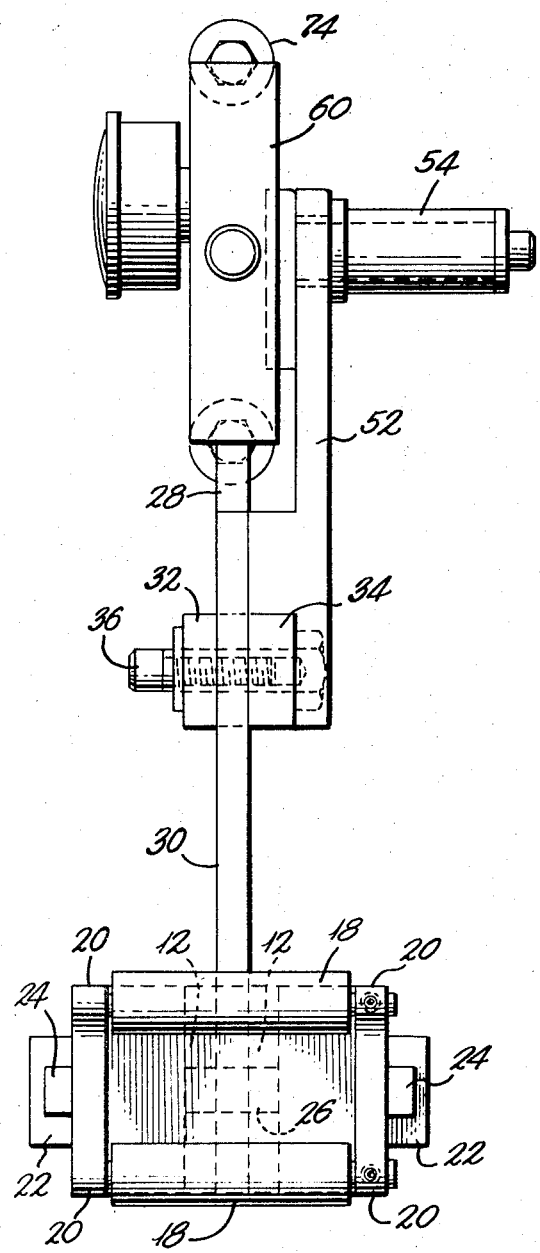
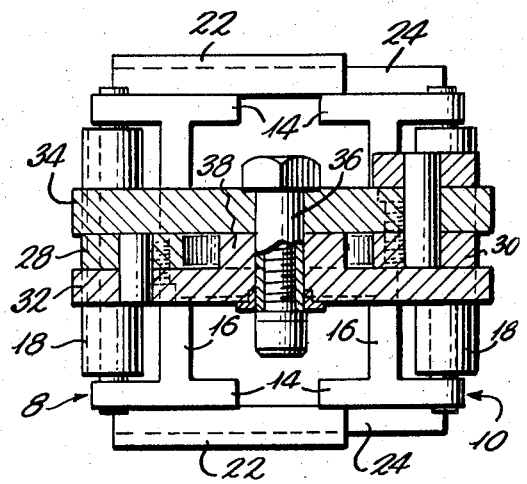
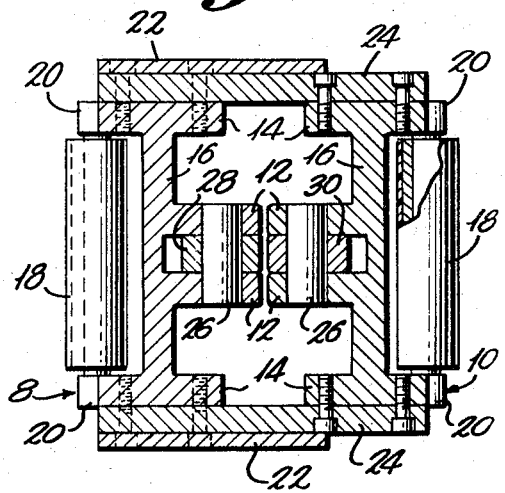
INVENTORS
Senate W. McNeely &
Hoyt G. Montgomery

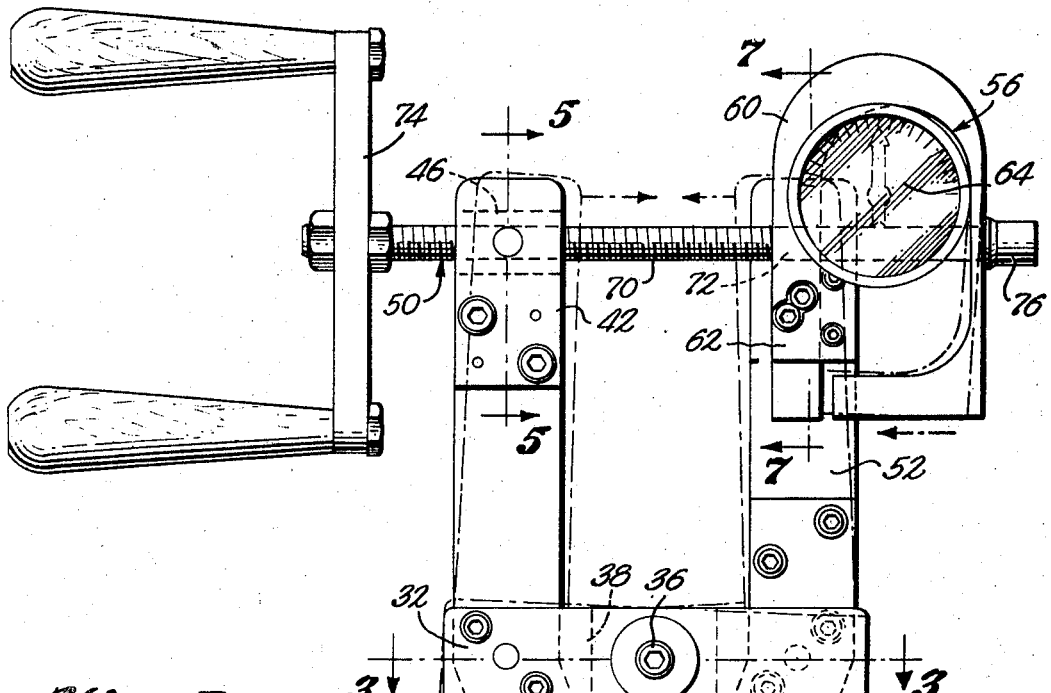
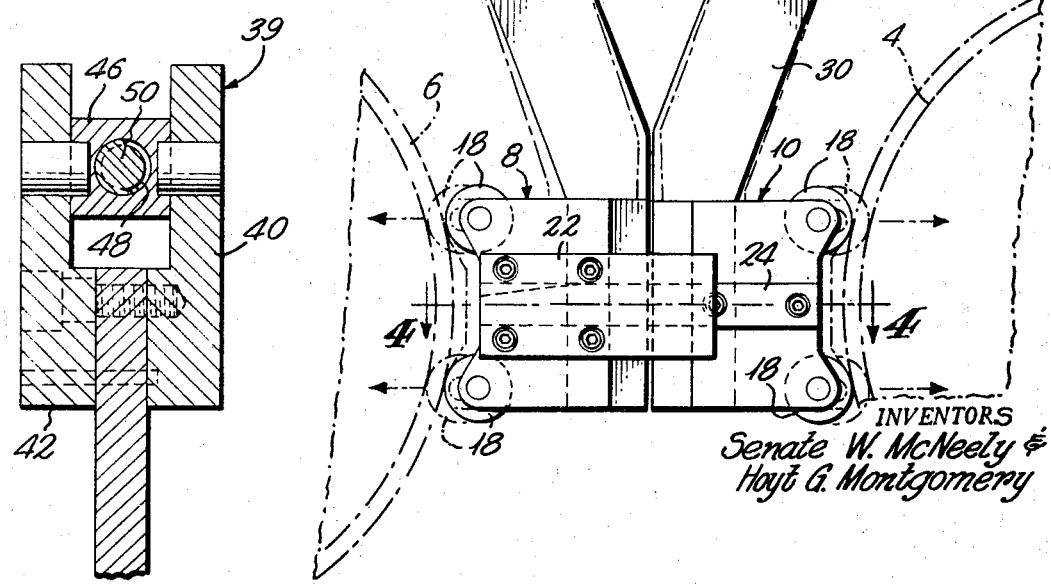

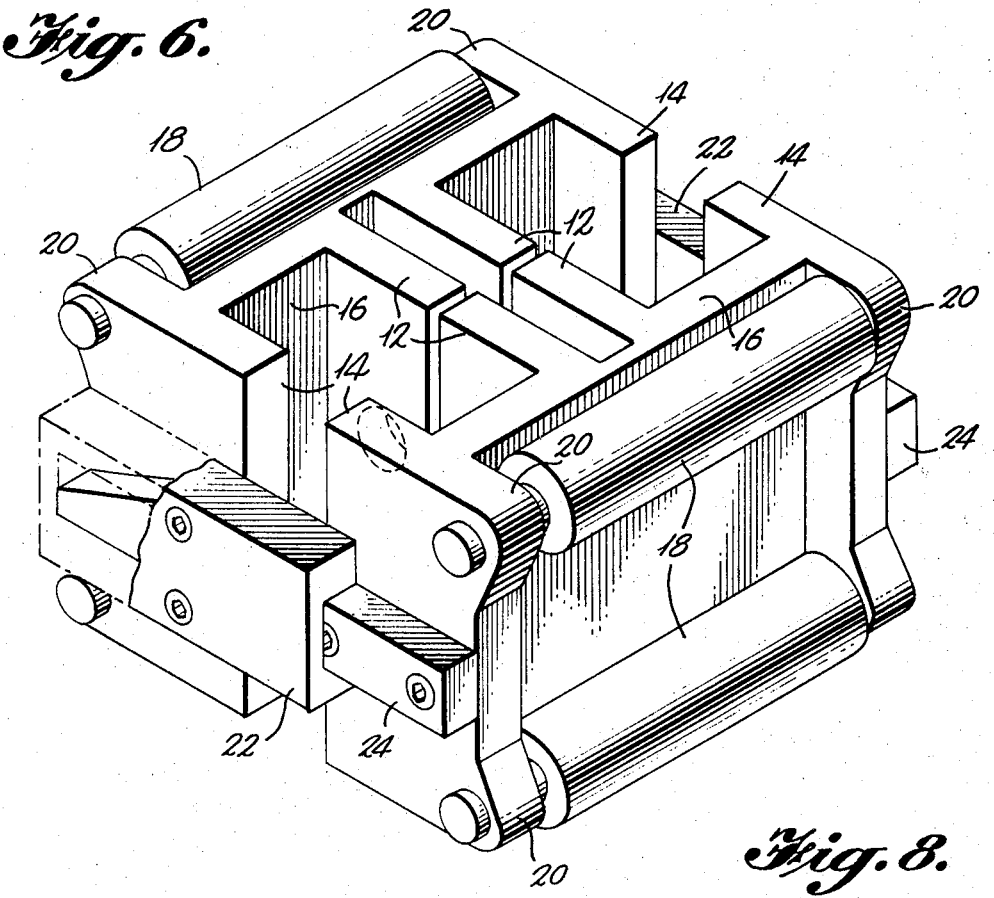
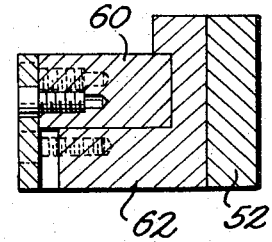
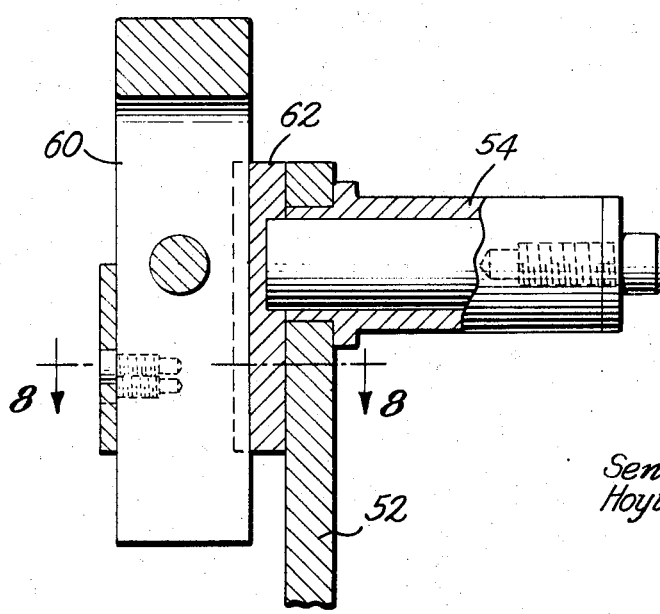

United States Patent Office 3,439,535
Patented Apr. 22, 1969

3,439,535
DEVICE FOR MEASURING MACHINE PRESSURE
Senate W. McNeely, Asheville, and Hoyt G. Montgomery, Candler, N.C., assignors to American Enka Corporation, Enka, N.C., a corporation of Delaware
Filed Aug. 11, 1966, Ser. No. 571,809
Int. Cl. G01l 5/16
U.S. Cl. 73—141                                         5 Claims

ABSTRACT OF THE DISCLOSURE

A device for measuring the pressure exerted between a pressor roll and a beam in a warper which comprises positioning means adapted to be located between the pressor roll and the beam for closely spacing the pressor roll adjacent to the beam; lever means for transmitting the pressure exerted by said pressor roll on said positioning means as a force; force measuring means operably associated with said lever means for determining the actual magnitude of the exerted pressure and means operably associated with the lever means for causing the positioning means to urge the pressor roll further away from said beam in a manner that stimulates the build-up of the yarn on said beam.

---

This invention relates to a device for measuring the machine pressure between two surfaces in pressure engagement. In particular, this invention relates to a portable device for determining the pressure exerted between a pressor roll and a beam in a warper or other like beaming machine duing different phases of the beaming operation.

In the textile industry, warpers or beamers are employed to wind yarns and the like onto beams which are then used in looms for the weaving of cloth. During operation of the warper, a pressor roll is held in pressure engagement with the warps as they are wound onto a beam. The pressor roll is urged toward the beam by a hydraulic piston, spring, weight, or other biasing or loading device. Good beam formation is determined to a large degree by the ability to control the pressure exerted by the pressor roll, which in turn regulates the density of the layers of yarns as they are added to the beam.

Heretofore, particularly during different phases of the beaming operations, it has been difficult to ascertain the actual exerted force between the pressor roll and the beam because of such unpredictable factors as the friction of the system, pressure gauge variations, and the like. Often fifty percent variations in the pressures between the pressor roll and beam of different warpers of the same make and model may be encountered. One method for determining what the pressure actually is has been to separate the pressor roll from the beam by hand and to then estimate the force. This practice, however, does not give very reliable results. Consequently, in instances where uniform densities in the layers of yarn on a set of different beams are required, it is usually necessary to run the complete set of beams on the same warper because the pressure cannot be accurately determined.

In addition, even when one warper is used, there is often a need to improve the beam formaiton and the "runoff" characteristics of the beam, i.e., to prevent trapping of the yarn ends during unwinding. In order to do this, the actual force between the pressor roll and the beam must be known.

Advantageously, this invention provides a pressure measuring device which overcomes many of the difficulties of the prior art in that the varibale pressure between the pressor roll and the beam that will exist due to build-up of the yarn on the beam can be determined accurately.

Thus, this invention contemplates a device especially suitable for measuring the pressure exerted between a pressor roll and a beam in a warper-type apparatus which comprises positioning means adapted to be located between the pressor roll and the beam for closely spacing the pressor roll adjacent to the beam, lever means for transmitting the pressure exerted by said pressor roll on said positioning means as a force, force measuring means operably associated with said lever means for determining the actual magnitude of the exerted pressure and means for determining the actual magnitude of the exerted pressure and means operably associated with lever means for causing the positioning means to urge the pressor roll further away from said beam in a manner that simulates the build-up of yarn on said beam.

More particularly, the device of this invention includes a pair of positioning blocks adapted to be centered between and in contact with the pressor roll and beam for spacing the pressor roll closely adjacent to the beam, said positioning blocks being coupled with each other to only allow linear motion towards and away from each other, lever means connected to each of said positioning blocks, a positioning screw threadably connected to a guide block pivotally mounted to one of said lever means and operably associated with the other of said lever means whereby rotation of said positioning screw in one direction causes said positioning blocks to move away from each other and to contact said pressor roll and said beam, a strain gauge operably associated with said positioning screw and said other lever means whereby the pressure exerted on said positioning means my said pressor roll is transmitted via the lever means and the positioning screw to produce a reading indicating the magnitude of said force on the strain gauge. Also, continual rotation of the positioning screw in the same direction is capable of causing further movement of said positioning blocks whereby said pressor roll and said beam are pushed further apart in a manner which simulates the build-up of yarn on said beam.

In addition, the positioning blocks of the invention are each provided with a pair of guide bars on each side that are fitted in a complementary manner for allowing movement of the positioning blocks in a linear direction to and from each other and for preventing vertical movement thereof. Advantageously, the sliding tongue-and-groove arrangement thus provided by the guide bars insures accurate and consistent measurement of the force exerted by said pressor roll in that the force is maintained in a constant direction during its measurement.

Also, this invention provides a device that has rollers on the positioning blocks in order to center the assembled positioning blocks between the pressor roll and the beam barrel and also to maintain correct centers as the pressor roll is pressed backwards and is rotated due to its gearing mechanism.

With these and other objects and advantage in view, the invention will become more apparent by reference to the following detailed description and accompanying drawings of a preferred embodiment of the invention in which:

FIGURE 1 is a view in elevation of the pressure measuring device of this invention operably positioned between and in contact with the beam barrel and a pressor roll;

FIGURE 2 is a view in elevation from another side of the device of this invention illustrating the arrangement of the lever arms and the strain gauge;

FIGURE 3 is a sectional plan view along line 3—3 of FIGURE 1 showing an enlargement of connection between the pivoting bars and pivoting shaft of the device;

FIGURE 4 is a sectional plan view taken along line

4—4 of FIGURE 1 which is enlarged to show the connection between the positioning blocks and the lever arms of this invention;

FIGURE 5 is a sectional view in elevation taken along line 5—5 of FIGURE 1 showing an enlargement of the pivotal connection between the positioning screw and one lever arm of this invention;

FIGURE 6 is a perspective view of the positioning blocks of the device assembled according to this invention;

FIGURE 7 is a sectional view in elevation taken along line 7—7 of FIGURE 1 showing an enlargement of the connection for rotatably mounting a strain gauge on a lever arm of this invention; and FIGURE 8 is a sectional plan view taken along the line 8—8 of FIGURE 7 showing a connection between the spring member and the support bracket of the strain gauge.

In FIGURE 1, the portable pressure measuring device of this invention is positioned between a pressor roll 4 and a beam 6 of a conventional type nylon warper. The device has a pair of positioning blocks or pads 8 and 10 which (as more fully illustrated in FIGURES 3, 4, and 6) have identical configurations. Each block has a pair of internal transverse ribs or flanges 12 and two external transverse ribs 14 joined together by a longitudinal rib 16. A pair of rollers 18 are provided on each block for contacting the cylindrical surfaces of the pressor roller and beam. The rollers are rotatably mounted on shafts that are journaled in extensions 20 of the external ribs. The rollers are parellel to each other and located equidistant from the longitudinal rib of the positioning blocks. Preferably, an outer polymeric surface such as nylon or the like which is nonabrasive and wear resistant is provided on the roller surfaces.

Positioning block 8 has two channel guide bars 22 fastened to its external ribs 14 which form channels or grooves along its sides. Two complementary guide bars 24 are secured to the sides of the external ribs of block 10 and are dimensioned to fit within the channels or grooves provided by channel guide bars 22. When assembled as a positioning and guiding unit, the two blocks 8 and 10 are symmetrically placed opposite to each other and the guide bars of each are fitted together. In this manner, the blocks can only move linearly toward and away from each other. Consequently, because of the parallel location of the rollers 18, and because of the controlled linear movement of the blocks, the pressor roll and beam are maintained in substantially parallel relationship.

Each pair of internal ribs 12 of the blocks 8 and 10 are provided with circular-shaped holes which have a common axis and which provide bearing surfaces for cylindrical metal pins 26. As shown in FIGURES 1 and 4, lever arms 28 and 30 are secured to pins 26.

The lever arms are closely spaced to each other at their lower ends within the assembly formed by blocks 8 and 10. As viewed in FIGURE 1, each lever arm has an integral portion which extends outwardly and upwardly from a lower vertical portion and an upper portion that extends vertically and parallel to the lower portion. Pivot bars 32 and 34 are rigidly fastened to arms 28 and 30, respectively, and are pivotally mounted to pivot shaft 36.

Pivot bar 32 has a boss-like projection 38 which spaces it from bar 34 and which provides an extended internal bearing surface for the pivot shaft.

The upper portion of lever arm 28 has a bifurcated support bracket 39 secured to it. As shown in FIGURE 5, the support bracket consists of two L-shaped elements 40 and 42, each of which have a bore for pivotally mounting the projecting shaft or bosses of guide block 46. The guide block has internal threads 48 which mate with the threads on positioning screw 50.

Lever arm 30 has an upper auxiliary arm 52 which is offset from and extends parallel to its upper portion. An extension on the lower part of auxiliary arm 52 provides groove-like channel with the upper portion of arm 30 for receiving one end of pivot bar 34. In this arrangement, bar 34 is offset from bar 32 to allow pivotal movement about shaft 36.

A cylindrical housing 54 for rotatably mounting a strain gauge 56 is secured to the upper portion of the auxiliary arm. (FIGURES 1, 2, and 7 show this arrangement in detail.) The strain gauge includes a spring member 60 which is attached to a bracket support 62 and is supported in such a manner that compression of the spring member produces a reading on the indicator dial 64 that is a measure of the force exerted.

Positioning screw 50 has a threaded portion 70 that travels through guide block 46 and an unthreaded portion 72 that extends through an opening in a flange of the bracket support 62 and then through an opening in the spring member of the strain gauge. A hand crank 74 is bolted adjacent to the threaded portion of the positioning screw and a retaining nut 76 is secured to its opposite end.

Operation of the pressure measuring device of this invention is as follows:

The device is placed between the empty beam 6 and the pressor roll 4 with the rollers 18 on block 10 in contact with the barrel of the beam. The pressor roll is then brought forward to fit snugly against the rollers 18 on positioning block 8. As shown in FIGURE 1, the device may be inserted with the upper portions of lever arms 28 and 32 in parallel relationship. The load pressure of the pressor roll causes the positioning blocks to be urged towards each other along a linear path. Because of the relative position of rollers 18, the positioning blocks 8 and 10 are centered between the pressor roll and the beam.

The force applied by the pressor roll to the positioning blocks via rollers 18 is transmitted to the lower portions of lever arms 28 and 30. The upper portions of the arms in turn tend to pivot outwardly about pivot shaft 36 and thus transmit the force to the positioning screw 50 via the threaded portion of the guide block 46 and the spring member 60. In this manner, the positioning screw is drawn to the left by guide block 46 (as viewed in FIGURE 1). Consequently, the unthreaded portion of the positioning screw slides in bracket 62 and compresses spring member 60. The strain gauge then provides a direct reading in pounds showing the pressure, i.e., the force exerted between the pressor roll and the beam when the pressor roll is spaced from the beam as shown in FIGURE 1.

Thus, it will be appreciated that the overall dimensions of the positioning blocks and their associated rollers preferably should be selected to obtain force readings as close to the barrel of the beam as possible. Usually the device is made so that readings can be made at distances on the order of about four inches.

After the force has been determined for a given spacing of the pressor roll and the beam, the hand crank of the positioning screw may then be slowly turned to force the lever arm 28 toward arm 30, which in turn causes the positioning blocks to move outwardly from each other and to force the pressor roll away from the beam. (These position changes are illustrated by the dash-dot lines shown in FIGURE 1.) During this movement, the rollers constantly center the positioning blocks so that accurate and consistent force readings can be obtained at different distances from the beam.

It will be recognized that the force applied by the positioning screw continuously balances the force exerted by the pressor roller for a given spacing so that the strain gauge continuously indicates by a direct reading in pounds substantially the actual magnitude of the exerted force. In this manner, the variable pressure that occurs during build-up of yarn on the beam during different phases of the beaming operation can be accurately simulated over an adjustable range of distances from the barrel of the beam.

It will be appreciated that the capacity of the strain gauge used in the present invention can be varied considerably depending on the specific intended applications of the device. In general, a gauge providing readings of from 0 to 250 pounds is effective for most applications. Moreover, although the specific embodiment shown in the drawings uses a compression type of strain gauge, it will be appreciated that the mounting bracket employed can be changed to allow use of a tension type of strain gauge.

Also, it will be recognized that the device of this invention measures the pressure over a specific adjustable distance, i.e., from a minimum corresponding to the space taken up by the positioning blocks when their internal ribs are substantially in contact, and to a maximum when the ends of guide bars 24 are almost removed from the channels of guide bar 22. However, the distance between the rollers 18 on block 8 and those on block 10 can be also increased by using spacer blocks or the like devices, or by increasing the moment arms of the lever arms.

In this regard, it will be understood that the moment arms of the device must shorten or lengthen in exactly the same ratio so that constant readings are obtained at given distances as the pressor roll and beam are pushed apart.

It will also be understood that many of the parts shown in the specific embodiment of the invention which are fastened to each other by pins, screws and the like may be made integral with each other if desired and that unless otherwise described are made of metal, e.g., steel, or other similarly strong structural material.

It will be still further appreciated that the device of this invention can be used to measure the actual force exerted between any two surfaces by substitution of suitably modified positioning blocks. For example, the device could measure force between rolls or flat surfaces or any combination of the two.

What is claimed is:

1. A device for measuring pressure exerted between a pressor roll and a beam in a warper-type apparatus consisting of positioning means comprising a pair of positioning blocks adapted to be centered between and in contact with the pressor roll and beam, said positioning blocks being coupled with each other to only allow linear movement towards and away from each other, lever means including lever arms connected to each of said positioning blocks, a positioning screw threadably connected to a guide block pivotally mounted to one of said lever arms and operably associated with the other of said lever arms whereby rotation of said positioning screw in one direction causes said positioning blocks to move away from each other and to contact said pressor roll and said beam, and force measuring means including a strain gauge operably associated with said positioning screw and the other lever arm whereby pressure exerted on said positioning means by said pressor roll is transmitted via the lever arms and said positioning screw to produce a reading of the magnitude of the exerted force on the strain gauge.

2. The device of claim 1 in which continual rotation of the positioning screw in the same direction is capable of causing further movement of said positioning blocks whereby said pressor roll and said beam are pushed further apart in a manner which simulates the build-up of yarn on said beam.

3. The device of claim 1 in which said positioning blocks each have guide bars complementally mated with each other to only allow linear movement of the blocks towards and away from each other.

4. The device of claim 1 in which said strain gauge is pivotally mounted on said other lever arm and has a spring member attached to said positioning screw whereby force transmitted via said screw causes deflection of the spring member and in turn a reading of the force exerted by said pressor roll on said strain gauge.

5. The device of claim 1 in which said positioning blocks each have a pair of rollers for centering the blocks between the pressor roll and the beam on a line parallel to the line extending through the centers of said pressor roll and said beam.

References Cited

UNITED STATES PATENTS

| 2,032,584 | 3/1936 | Lengel et al. | 73—141 |
| 2,759,358 | 8/1956 | Tew | 73—141 |

CHARLES A. RUEHL, *Primary Examiner.*